United States Patent
Rosset et al.

(10) Patent No.: US 6,931,527 B1
(45) Date of Patent: *Aug. 16, 2005

(54) METHOD AND SYSTEM FOR ENSURING THE SECURITY OF FAX TRANSMISSION USING AN IDENTIFYING CARD

(75) Inventors: Franck Rosset, Paris (FR); Alain Gayet, Courvevoie (FR); Jean Moulin, Draveil (FR)

(73) Assignee: Fintel S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/297,164

(22) PCT Filed: Sep. 25, 1997

(86) PCT No.: PCT/FR97/01686

§ 371 (c)(1),
(2), (4) Date: Jul. 12, 1999

(87) PCT Pub. No.: WO98/21880

PCT Pub. Date: May 22, 1998

(30) Foreign Application Priority Data

Nov. 8, 1996 (FR) .................................. 96 13916

(51) Int. Cl.$^7$ ............................................ G06F 15/28
(52) U.S. Cl. .................... 713/151; 713/151; 713/200; 380/252; 380/277; 379/123; 379/130; 705/39
(58) Field of Search .......................... 713/151, 200; 380/252, 277; 379/88.08, 88.2, 88.24, 88.27, 379/110, 167, 123, 130; 705/39

(56) References Cited

U.S. PATENT DOCUMENTS 4,707,592 A    11/1987 Ware (Continued)

FOREIGN PATENT DOCUMENTS

CA    2085775    6/1994

(Continued)

OTHER PUBLICATIONS

Edward C. Chung and M Celenk, Implementation of a Fax distribution System in the Local Area Networks for PCs, IEEE Global Telecommunications Conference, Globecom, '92, Orlando, Florida, Dec. 6-9, 1992; Conference Record vol. 2, 1992, pp. 964-968.*

*Primary Examiner*—Ayaz Sheikh
*Assistant Examiner*—Taghi T. Arani
(74) *Attorney, Agent, or Firm*—Merchant & Gould P.C.

(57) ABSTRACT

The invention concerns a method and system for safely transmitting a fax between a transmitter sending the fax and at least a receiver (11) receiving the fax (162) using a fax machine (161) associated with a telephone equipment (16). The faxes (162) are routed between a transmitter and a receiver by a communication network (15) via a fax management center (30). The fax management center (30) provides the receiver (11) with a card, formatted like a credit card, personalized by specific identifiers for each card and each receiver. This card (10) emits brief identifying sound signals, of the DTMF type, at least partially encrypted, varying with each operation, when it is actuated (14) by the receiver (11). The signals received by the microphone (17) of the telephone equipment (16) are transmitted by the communication network (15) to the computer services (18) of the fax management center (30). The transmitted signals and the identification data of the receiver and of the card held (23) by the computer services (18), are electronically processed (24) and compared (25) by the computer service (18) of the fax management center. In the event of coincidence, the fax management center, (30), transmits to the fax machine (161) of the receiver (11), the fax (162) sent to him by the transmitter.

10 Claims, 3 Drawing Sheets

U.S. PATENT DOCUMENTS

Figure 1:
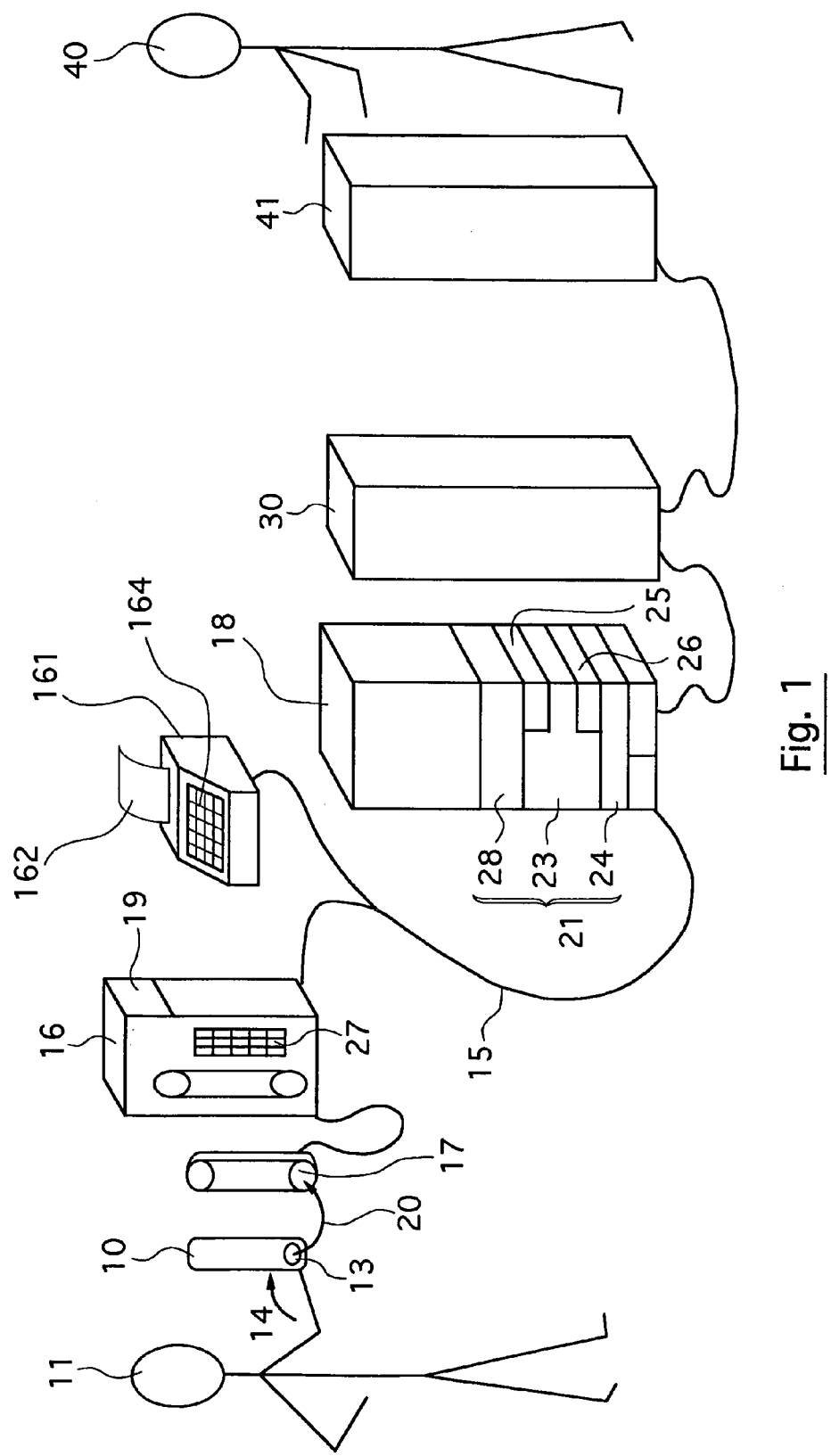

| | | | |
|---|---|---|---|
| 4,928,098 A | 5/1990 | Dannhaeuser | |
| 4,998,279 A | 3/1991 | Weiss | |
| 5,392,336 A * | 2/1995 | Chang et al. | 379/93 |
| 5,583,933 A * | 12/1996 | Mark | 379/355 |
| 5,675,507 A * | 10/1997 | Bobo, II | 364/514 |
| 6,377,670 B1 * | 4/2002 | Rosset et al. | 379/144.05 |

FOREIGN PATENT DOCUMENTS

| | | |
|---|---|---|
| DE | 43 25 459 | 2/1995 |
| EP | 0 360 732 A | 3/1990 |
| EP | 0 374 012 | 6/1990 |
| EP | 0 423 035 | 4/1991 |
| EP | 0 459 781 | 12/1991 |
| EP | 0 609 143 A | 8/1994 |
| EP | 0 695 076 A | 1/1996 |
| FR | 2 701 181 | 8/1994 |
| GB | 2 274 523 | 7/1994 |
| JP | 63-211843 | 9/1988 |
| WO | WO 82/04169 | 11/1982 |
| WO | WO 88/05294 | 5/1988 |
| WO | WO 96 04741 A | 2/1996 |
| WO | WO 96/31971 | 10/1996 |
| WO | WO 97/03421 | 1/1997 |
| WO | WO 97/12471 | 4/1997 |

* cited by examiner

METHOD AND SYSTEM FOR ENSURING THE SECURITY OF FAX TRANSMISSION USING AN IDENTIFYING CARD

The domain of this invention is fax transmission methods and systems. For reasons of clarity, persons who wish to send or receive a fax will be referred to as the "receiver" and "sender" respectively in the rest of this text.

More precisely, the invention relates to a method and a system for reliably sending a fax between a sender sending a fax and at least one receiver receiving the fax by means of a fax machine associated with telephone equipment (or a terminal emulating this function), the faxes being routed between the sender and the receiver through a communications network via a fax management center.

The invention also relates to a method and a system for reliably transmitting a fax between at least two persons, one (the sender) sending the fax by means of a first fax machine associated with first telephone equipment (or a first terminal emulating this function), and the other (the receiver) receiving a fax by means of a second fax machine associated with second telephone equipment (or a second terminal emulating this function), the faxes being routed through a communications network via a center for management of faxes exchanged between sender and receiver.

Some service providers may need to send faxes for the use of their subscribers or their customers (bank or financial accounts, including or not including personal information, local weather forecasts, town council information, etc.), which must be prevented from being accessed by unauthorized persons, or persons who have not paid their subscription. Similarly, a large number of companies (personnel services, financial services, commercial services, decentralized units) and freelance professions (lawyers, notaries, chartered accountants, etc.) may need to exchange faxes containing confidential information that they do not want to get into the hands of third parties.

The problem that arises is to prevent a dishonest user from accessing the fax management center without authorization and without paying the corresponding costs.

To solve this problem it has been proposed to use access keys generated by the sender or the receiver using a multimedia terminal or peripheral telephone equipment. Document EP 360-A-0360-732 in the name of Richard Gordon describes this type of pin codes that the user inputs manually using a keypad. Apart from their costs, these solutions are not very practical and take a long time to set up. The problem that arises can only really be solved if a solution is known to another problem—how to design a method and system that is convenient to use and that can be quickly and economically installed. Ease of use and time savings are major problems for any product aimed at the general public, and cannot be ignored.

A proposal has been made (document WO 96 04741 in the name of Andrew Mark) to use a card emitting encrypted DTMF type acoustic signals, to dial telephone numbers. Thus, the holder of this type of card can couple it to the microphone in the telephone handset, to automatically transfer his identifiers. Since these identifiers are encrypted, a third party should not be in a position to understand the contents. Therefore A. Mark's solution is applicable to a technical sector quite different from secure transmission of faxes between a sender and a receiver via a fax management center. Furthermore, there is nothing to stop the signals emitted by A. Mark's card from being recorded, and a defrauder in possession of this type of recording could substitute himself for the card holder. Therefore, A. Mark's solution cannot prevent a dishonest user from accessing the services offered by the fax management center, without authorization.

The objectives of this invention are achieved, and the problems that arise with techniques according to prior art are solved according to the invention by means of the methods described below.

In the case of a fax transmission by a sender to several receivers, the method according to the invention comprises the following steps:

the fax management center provides the receiver with a card, the same size as a credit card, personalized by specific identifiers for each card and each receiver, the said card emits short DTMF type acoustic identification signals, at least partly encrypted and different in each operation, when it is activated by the receiver.

The said method also comprises the following steps:

the receiver activates his card such that it sends acoustic identification signals, signals received by the microphone in the telephone equipment are transmitted via the communications network and received by the computer service in the fax management center, the transmitted signals and the sender and card identification data held by the computer service are methoded and electronically compared by the computer service in the fax management center, if they are conform, the fax management center forwards the fax addressed by the sender fax machine to the receiver.

In the case of a fax transmission between several senders and receivers, the sender sends the fax by means of a first fax machine associated with first telephone equipment (or a first terminal emulating this function), the receiver receives the fax by means of a second fax machine associated with second telephone equipment (or a second terminal emulating this function). Faxes are routed through a communications network via a fax management center. The method according to the invention comprises the following steps:

the fax management center provides the sender and the receiver with a card, the same size as a credit card, personalized by a different identifier for each sender and for each receiver, the said cards emit short acoustic DTMF type identification signals, at least partly encrypted, varying in each operation, when they are activated by the sender or the receiver, the said acoustic identification signals are received by the microphone in the telephone equipment (or the terminal emulating this function) and are converted into electronic signals before being sent through the communications network to the computer service in the fax management center.

The method also comprises the following steps:

the sender activates his card such that it sends acoustic identification signals, the signals received by the microphone in the first telephone equipment and transmitted through the communications network, and the sender and card identification data held by the computer service, are methoded and electronically compared by the computer service in the fax management center, if they are conform, the fax sent by the sender by means of the fax machine is stored by the fax management center, the receiver activates his card such that it sends acoustic identification signals, the signals received by the microphone in the receiver's telephone equipment and transmitted through the communications network, and the receiver and card identification data held by the computer service, are methoded and electronically compared by the computer service in the fax management center, if they are conform, the fax management center sends the fax stored by the fax management center to the receiver's fax machine.

Thus, using this method, the fax management center can verify that the sender and/or the receiver actually have an authentic card and not a computer artifice. It was also able to identify the card holder as being a person authorized to send and/or receive the copy addressed to him. Furthermore, defrauders cannot determine identification data since they are automatically transmitted in encrypted form. Furthermore, even if he has recorded acoustic signals in any form whatsoever, a defrauder will be unable to identify himself to the fax management center. The acoustic identification signals are different for each operation, in other words every time that the card is used.

Preferably the said card:

also counts the number of times $C(p,n)$ that it is used, emits acoustic signals representing the number of times $C(p,n)$ that it has been used, encrypts acoustic signals as a function of the number of times $C(p,n)$ that it has been used.

Also preferably, the said computer means of methoding and electronically comparing the transmitted signals and the sender and receiver and card identification data held by the computer service in the fax management center, store the number of times $C(p,m)$ that the card has been used at the time of the last validated operation, compare the number of times $C(p,n)$ that the card has been used at the time of the current operation, with the memorized number of times N1, refuse the current operation if $C(p,n)$ is less than or equal to $C(p,m)$ and continue verifying the current operation if $C(p,n)$ is greater than $C(p,m)$, recalculate electronic signals $S'(p,n)$ as a function of identification data and the number of times $C(p,n)$ that the card has been used, during the current operation, and then compare them with the transmitted electronic signals $S(p,n)$.

In one variant embodiment of the method designed to increase security, the method also comprises the following step: the sender and/or the receiver use a keypad associated with the telephone equipment and/or the card, to send a pin code. After being sent to the computer service in the fax management center through the communications network, this pin code is methoded and compared with the pin code of the sender and/or the receiver held by the computer service in the fax management center. Thus, the fax management center can verify that the sender and/or the receiver is actually the person authorized to receive the confidential fax. A defrauder will be unable to use a stolen card.

Advantageously, the fax management center sends a confidential fax waiting report to the receiver, in order to inform him that a fax is waiting for him to collect it.

The method may also be designed such that the fax management center sends a fax collected report to the sender.

The invention also relates to a system for transmitting a fax in a reliable manner between a sender sending the fax and at least one receiver receiving the fax using a fax machine associated with telephone equipment (or a terminal emulating this function), the faxes being routed between the sender and receiver through a communications network via a fax management center.

One of the characteristics of this system is that it comprises means of embodying the above defined method and its variant embodiments.

More particularly,

The system according to the invention includes at least one card for use by the receiver, the same size as a credit card, personalized by identifiers specific to each card and to each receiver. The said card comprises means of emitting short DTMF type acoustic identification signals activated by the receiver using an element accessible from the outside of the card. The said card also includes encryption means used to at least partly encrypt the acoustic signals, and to vary them, every time that the card is used.

The system according to the invention comprises telephone equipment (or any terminal emulating this function) comprising a microphone designed to receive and transform received acoustic signals into electronic signals transmitted through the communications network to the computer service in the fax management center.

The system according to the invention also comprises computer means associated with the computer service in the fax management center, connected to the communications network, the said computer means comprising:

a database containing the references of each card and each receiver and their identification data, means of methoding and of comparing electronic signals and identification data contained in the database, sending means which, if the checks are conform, will send the fax addressed by the sender to the receiver's fax machine.

The invention also relates to a system of reliably transmitting a fax between at least two persons, one (the sender) sending the fax by means of a first fax machine associated with first telephone equipment (or a first terminal emulating this function), the other (the receiver) receiving the fax by means of a second fax machine associated with second telephone equipment (or a second terminal emulating this function). The faxes are routed through a communications network via a fax management center managing faxes exchanged between sender and receiver.

The system comprises at least two cards, one for use by the receiver and the other for use by the sender. These cards, the same size as a credit card, are personalized by identifiers specific to each card and to each sender or receiver. Each card comprises means of sending short DTMF type acoustic identification signals activated by the sender or the receiver, by means of an element accessible from the outside of the card. Each card also comprises encryption means of at least partly encrypting and varying the acoustic signals every time that the card is activated.

The system is such that the first and the second telephone equipment (or the first or the second terminal emulating this function) comprise a microphone that will receive and transform the received acoustic signals into electronic signals transmitted through the communications network to the computer service in the fax management center.

The system also comprises computer means, associated with the computer service in the fax management center, connected to the communications network.

These computer means comprise:

a database containing the references of each card and each receiver or sender and their identification data, means of methoding and means of comparing electronic signals and identification data contained in the database, storage means, storing the fax emitted by the first fax machine if the sender's card identifiers are validated, sending means sending the fax to the receiver's fax machine, if the receiver's card identifiers are validated.

Thus with this system, the fax management center can verify that the sender and/or the receiver actually have an authentic card and not a computer artifice. It could also identify the card holder as being a person authorized to receive the copy addressed to him. Furthermore, defrauders will be unable to determine identification data since they are automatically transmitted in encrypted form.

Furthermore, recording of acoustic signals in any form whatsoever will be of no use to a defrauder to help him identify himself to the fax management center. The acoustic identification signals vary with each operation, in other words each time that the card is activated.

Preferably, the card also comprises:

an incremental counter interconnected to emission means and encryption means that is incremented by at least one unit every time that the card is used.

Consequently, the state of the incremental counter is sent to the computer means and acoustic signals are encrypted as a function of the state of the incremental counter.

Preferably, the said computer means also comprise:

means of memorizing the state $C(p,m)$ of the incremental counter at the time of the last validated operation.

means of comparing the state $C(p,n)$ of the incremental counter emitted during the current operation with the state $C(p,m)$ of the memorized incremental counter.

Consequently, the check on the current operation is refused if $C(p,n)$ is less than or equal to $C(p,m)$ and is continued if $C(p,n)$ is greater than $C(p,m)$.

Also preferably, the said methoding means and the said means of comparison of the electronic signals and identification data contained in the database include means of recalculating the electronic signals as a function of the state $C(p,n)$ of the incremental counter and the identification data, and then comparing them with the transmitted electronic signals.

In one variant embodiment, the said computer means may also comprise the following in order to increase the security of the system:

second means of comparing the receiver's pin code contained in the database, with a pin code, sent by the receiver, using a keypad associated with the receiver's telephone equipment or card, and, transmitted to the computer means in the fax management center, through the communications network.

Thus, the fax management center can verify that the receiver is actually authorized to make use of its services. A thief will not be able to use a stolen card because he does not know the pin code.

Advantageously, in order to inform the receiver that a fax is waiting for him, the fax management center comprises means that send a fax waiting report to the receiver.

The system may also be designed such that the fax management center also comprises means of sending a fax collected report to the sender.

Figure 2:
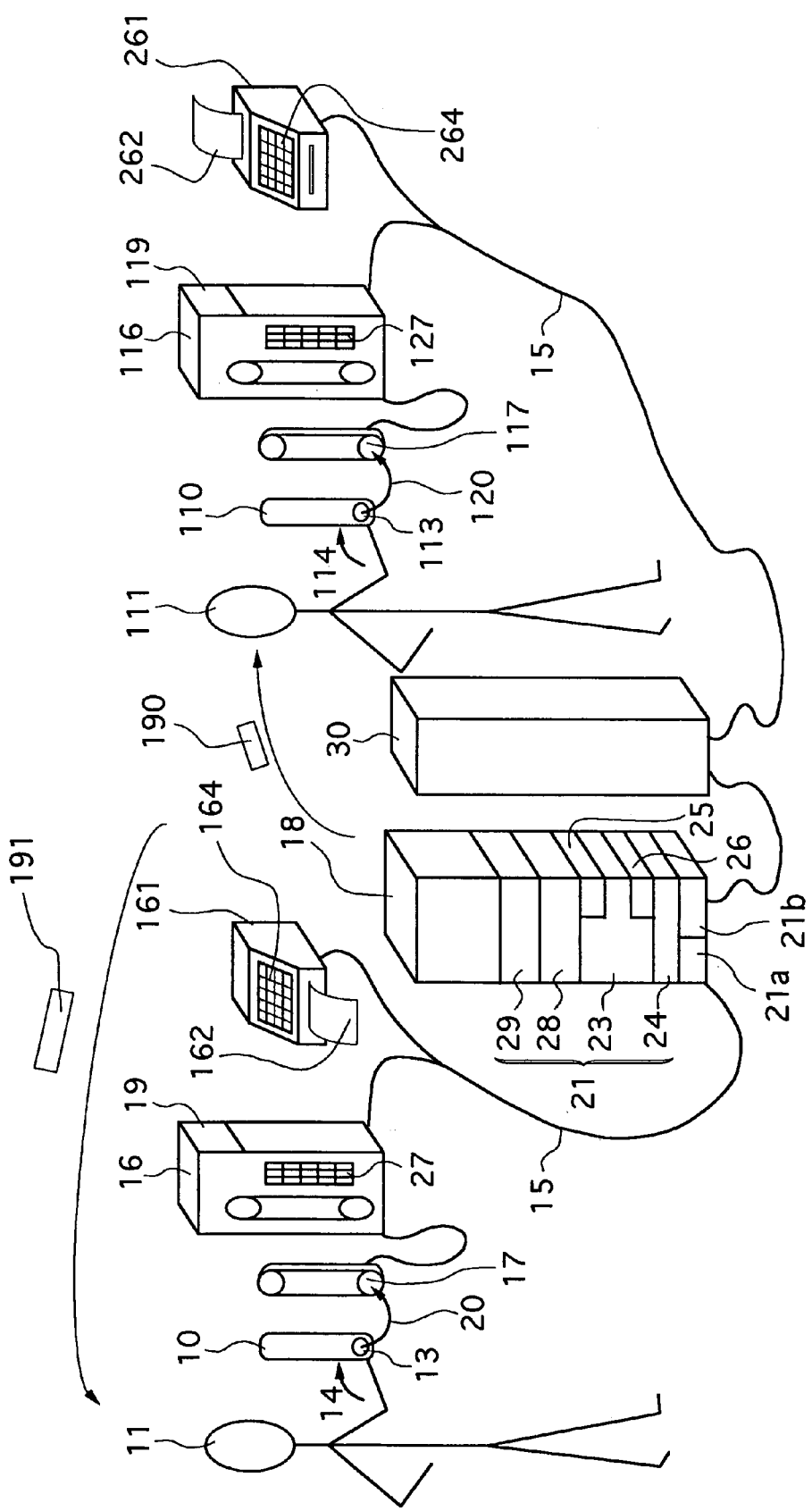
Figure 3:
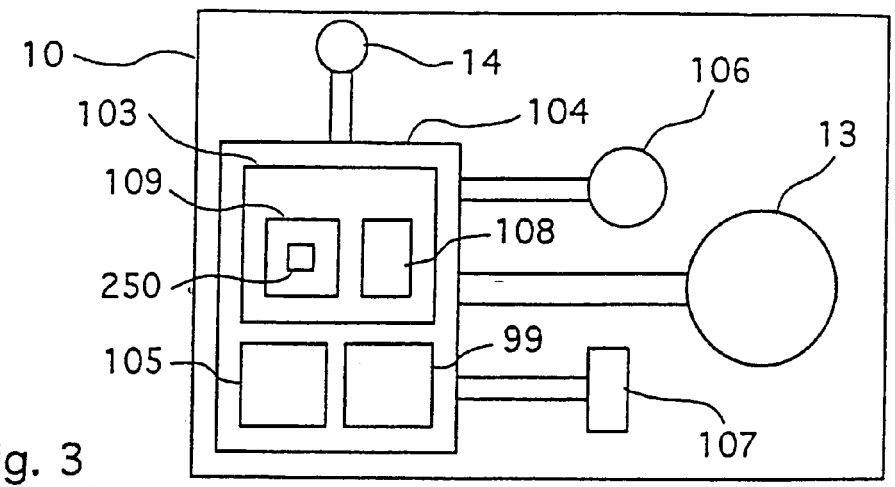
Figure 4:
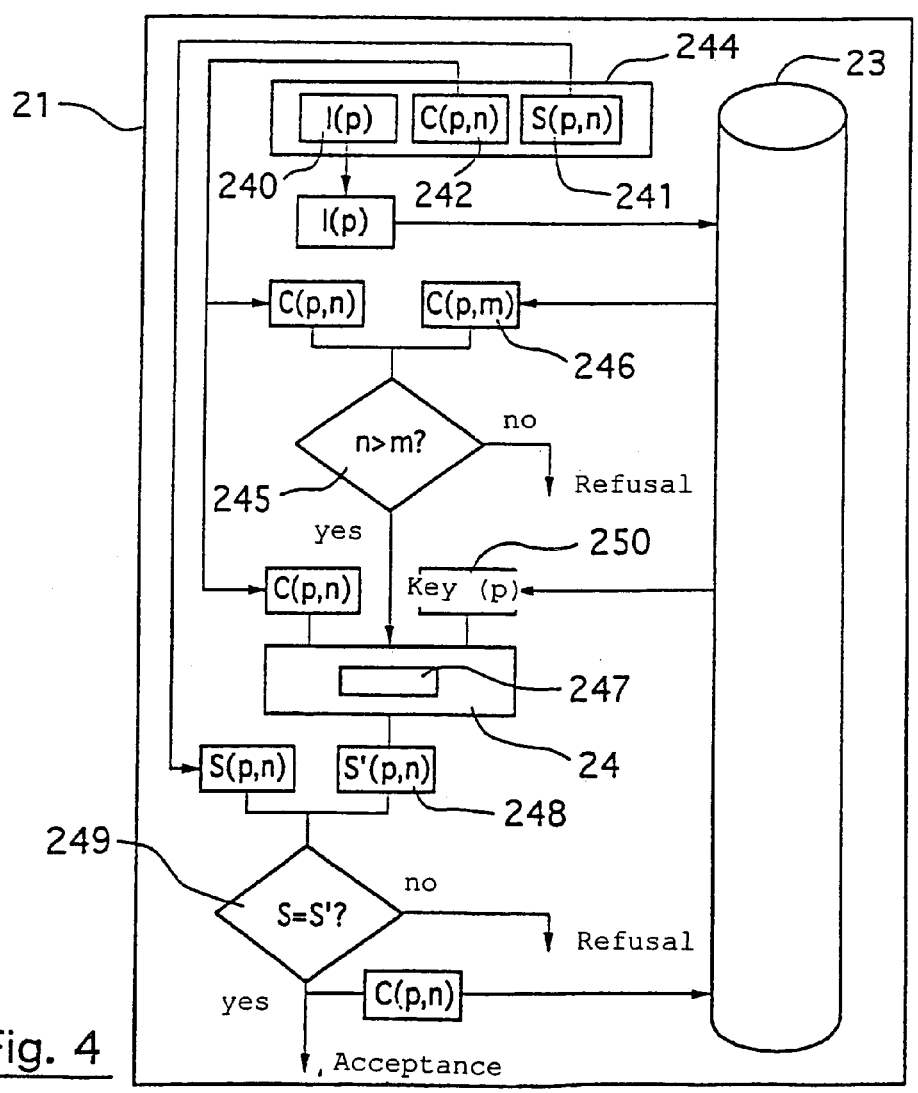

Other characteristics and advantages of the invention will become clear by reading the description of variant embodiments of the invention given for information purposes and in no way restrictive. The figures show:

FIG. 1: the system and the method according to the invention in the case of a fax transmission by a sender to several receivers, FIG. 2: the system and the method according to the invention in the case of a fax transmission between several senders and receivers, FIG. 3: the card in the form of a block diagram, FIG. 4: the algorithm for verification of the authenticity of the transmitted signal.

The description will be made with reference to FIG. 1. The system and method according to the invention enable the receiver 11 to receive a fax 162 reliably and quickly, through a fax machine 161 associated with a telephone handset 16 comprising a microphone 17, the fax 162 being sent by the fax management center 30 belonging to a service provider 40 to subscriber receivers 11 or customers of its services 41 (weather services, personalized stock exchange services, etc.). The telephone handset 16 and the receiver's fax machine located remotely from the computer services 18 in the fax management center 30 are connected to the computer services 18 via a communications network 15.

The system comprises a card 10, the same size as a credit card, personalized by specific identifiers for each card and for each receiver. This card is provided to receivers by the fax management center 30 or service providers 40, 41. The card 10 comprises emission means 13, particularly a loudspeaker 13 that emits short DTMF type acoustic identification signals 20. These signals 20 are sent when emission means 13 are activated by the receiver using an element 14 accessible from the outside of the card (not shown in FIG. 1 since it is on the other side of the card). These emission means 13 are excited by a DTMF signal generator 99 controlled by a micromethodor 104 powered by a battery 106 and controlled by a resonator 107. The micromethodor 104 contained in the card comprises encryption means 103 for at least partly encrypting acoustic signals 20, comprising an encryption algorithm 108 and specific identifiers 109 for each card 10 and for each customer 11, particularly the secret key 250 used by the encryption algorithm 108. The acoustic signals 20 are received by the microphone 17 on the telephone handset, the customer putting the card 10 into contact with the microphone. The system also comprises means 19 of transmitting acoustic signals 20 located in the telephone handset 16. These transmission means 19 transmit signals, after methoding and conversion into electronic signals, via the communications network 15.

The system also comprises computer means 21 dependent on the computer services 18 in the fax management center 30. These computer means are connected to the communications network 15 and are remote from the telephone handsets 16 and the fax machines 161.

These computer means 21 themselves comprise:

a database 23 containing the references of each card and each receiver and their identification data, methoding means 24 and means 25 of comparing electronic signals and identification data contained in the database, means of sending the fax 28 which, if the check is conform, send the fax 162 addressed to the receiver 11 by the sender, to the receiver's fax machine 161.

Therefore, the sequence of use is as follows:

The receiver 11 dials the telephone number of the fax management center on the keypad 164 of his fax machine. When the line is taken, a voice prompts him to identify himself with his card 10.

The receiver 11 uses his card 10 with the microphone 17 on the telephone handset 16 associated with the fax machine 161. He is then immediately identified and his card 10 is authenticated.

He then hears his fax machine 161 enter into contact with the fax management center 30. He can then hang up his telephone since his fax machine 161 has taken the communications line 15, and then within the same telephone call, he receives the fax 162 containing the expected information.

Preferably, as we will now describe with reference to FIGS. 3 and 4, the micromethodor 104 and encryption means 103 are designed such that the acoustic signal 20 is different in each operation. Encrypting an identification code means transforming it into a sequence of information, in which each individual part is incomprehensible and which can only be encrypted by the person holding the encryption key. But this in no way prevents the encrypted identification code from being copied, either during its acoustic transmission (recording) or by pirating on the telephone line. If this copy is improperly used by a defrauder, the receiving system will treat it as having all the characteristics of the original, and it will then be interpreted in order to verify the identifiers of the card.

Therefore the problem that arises is how can any reproduction attempt be made impossible? The following describes several variant embodiments to the general means that is used to make a distinction between the original and the copy when analyzing the encrypted signal received by the computer means 21, by inserting a distinctive element in the DTMF type signal 20 emitted by the card 10.

One of the variants consists of using a "time-dating" function (for example as described in U.S. Pat. No. 4,998,279). This time-dating function uses the "time" parameter that changes continuously. Thus the "copy" is delayed when it is emitted. This type of solution requires that the emission means 13 and the computer means 21 are synchronized. In order to do this, both must have a "time base" and "frequency standard". These two time bases have their own precision and their own drift. The result is that they slowly but gradually become desynchronized. In order to overcome this technical difficulty, a certain amount of drift is tolerated between the time bases of the emission means 13 and the computer means 21. As this drift increases, the uncertainty about the "validity" of the information received and the risk of fraud also increases. Thus, if a drift of one minute is tolerated, the analysis system in the computer means 21 will consider that an illegal copy of the encrypted signal emission is valid if it is reused fraudulently within the next 30 seconds.

Another variant consists of using incremental lists (for example as described in U.S. Pat. No. 4,928,098). The emission device and the reception device have an ordered list of the successive encryptions of the identification code, or have algorithms that can be used to prepare them as time goes on. At a given instant, computer means 21 are waiting for the encrypted result C(n). If they actually receive the message C(n), it validates the operation. But the computer means 21 may receive a different message, the card user may have activated the card's emission means 13 several times, possibly by playing with it or perhaps accidentally, so that the card is in the situation that it emits the encrypted result C(n+p) the next time that it is used with the computer means 21. If the computer means 21 receive a different message, they will search forwards in the list of successive encrypted results to see if there was a message C(n+p) identical to the received message. One way of removing the ambiguity between "is this an authentic message emitted by the emitter?" or "is it a fraudulent message?" is to request the next emission, or wait for it. If the next message is identical to C(n+p+1), the system validates the message and puts itself in waiting for the next emission in state C(n+p+2). If it is different, the message is not validated and the analysis system remains in waiting for message C(n). This variant embodiment is not very ergonomic since it obliges the card holder to activate the card several times.

According to one preferred variant embodiment for distinguishing the original signal from its copy, the onboard micromethodor 104 in card 10 comprises an incremental counter 105. The incremental counter 105 is incremented by one or several units each time the card is used. Obviously, like a ratchet, it cannot go backwards, and simply move forwards every time it is used.

In the case of this variant embodiment, the state C(p,n) 242 of the counter 105 is used in the calculation of the encrypted message 244 sent by emission means 13. The algorithm 108 (for which the equivalent algorithm 247 is memorized in the computer means 21) calculates the encoded part S(p,n) 241, using the secret key 250 specific to each card and the state C(p,n) 242 of the counter 105. In addition to the identification number I(p) 240 of the card and the encrypted identification code S(p,n) 241, the card 10 emits the state C(p,n) 242 of its incremental counter 105 during each emission. The computer means 21 memorize 230 the state C(p,n) 242 of the incremental counter 105 during the last validated operation, in the database 23. Thus each time a message 244 is received, the comparison means 25 in the computer means 21 can compare 245 the information received about the state C(p,n) 242 of the counter 105, with the previous information received C(p,m) 246 stored in memory 230, 23.

a) If the state C(p,n) 242 of the counter 105 (FIG. 2) expressed in message 244 is greater than the previously received state C(p,m) 246 (n>m), then the message 244 is accepted and the analysis continues.

b) If the state C(p,n) 242 of the counter 105 expressed in message 244 is less than or equal to the previously received state C(p,n) 246 (n£m), then the message will be refused. The received message can only be a copy made previously or a computer artifice.

If the conditions described in item a) above are satisfied, the computer means 21 can be used to read the fixed part I(p) 240 and to search for the corresponding secret key for the card in their own database 23, 230. The calculation means 239 in the methoding means 24 may then calculate the encrypted code expected by the computer means 21, using the algorithm 247, the state of the counter C(p,n) 242 and the secret key (p) 250. The comparison means then compare 249 the encrypted code S'(p,n) 248 thus calculated with the encrypted code actually received S(p,n) 241. Therefore this method and these means can validate or invalidate message 244, without the need for the card user to activate the card several times as is the case in the variant embodiment described above.

The existence of an incremental counter 105 in card 10 can define the maximum number of times that the card can be used when the card is being individually programmed, at no additional cost. Once this maximum has been reached, the card will no longer emit a consistent message and is therefore refused by the computer means 21.

The emitted frame 244 contains the following for a given card (p),
- a fixed part I(p) 240 (the card identification number),
- a variable incremental part C(p,n) 242 (the state of the counter),
- a variable part S(p,n) 241 which is apparently random (the result of an encryption algorithm 108 on the secret key 250 specific to this card (p)).

The frame emitted:
- is always different on each different card,
- for a given card, is always different on each emission.

For a given card (p), the computer means 21 can:
- read the fixed part I(p) 240 (the card identification number),
- search in their own database 23 for the secret key 250 of this card and the last record received of the state C(p,m) 246 of the counter 105 on this card,
- refuse this frame 244 if the state of the counter C(p,n) 242 for the current operation is less than or equal to the previously received state C(p,m) 246, and continue the verification of the current operation if the state C(p,n) 242 is greater than the previously received state C(p,m) 246,
- decrypt the received message 244 and validate its contents, by recalculating it using the encryption algorithm 247, the specific key 250 for this card and the state of the counter C(p,n) 242 and then comparing the result of the calculation with the received message.

Thus using this combination of means, it is possible to emit DTMF type acoustic identification frequencies using a card the same size as a credit card, the frequencies being received by the microphone in equipment connected to the telephone network and being certain of the authenticity of the calling card and thus eliminate the possibility of any defrauder using a sound or computer record or a computer artifice. In order to increase the security of the system, in the variant embodiment shown in FIG. 1, computer means 21 also comprise second comparison means 26. These comparison means 26 can be used to compare a receiver's pin code contained in the database 23, with the pin code emitted by the receiver. This code is emitted by means of a keypad 27 used with the telephone handset 16 and/or the card 10 and/or using the keypad 164 on the fax machine 161. This code is transmitted to the computer means 21 in the fax management center, through the communications network 15.

Thus, the fax management center and service providers 40, 41 are assured that the receiver 11 is actually the person authorized to enter into contact with the services provided by service providers. A thief cannot use a stolen card because he does not know the pin code.

We will now describe FIG. 2, which shows the system and the method according to the invention when used for transmitting faxes between several senders and receivers. Many companies (personnel services, financial services, commercial services, decentralized units) and freelance professions (lawyers, notaries, chartered accountants, etc.) need to exchange faxes containing confidential information that they would not like to get into the hands of third parties.

The system and the method according to the invention can be used to transmit a fax 162, 262 in a reliable manner between at least two persons, one (the sender) 11 sending the fax 162 using a first fax machine 161 associated with first telephone equipment 16 (or a first terminal emulating this function), and the other (the receiver) 111, receiving the fax 262 using a second fax machine 261 associated with a second telephone equipment 116 (or a second terminal emulating this function).

Faxes are routed through a communications network 15 via a fax management center 30 managing faxes exchanged between the sender 11 and receiver 111.

The system comprises at least two cards 10 and 110, one 10 for use by the sender 11, the other 110 for use by the receiver 111. These cards are provided to senders and receivers by the fax management center 30 or by a telecommunications operator or by a service provider. Each card is the same size as a credit card, and is personalized by identifiers specific to each card and to each sender or receiver. Each card comprises means 13, 113 of emitting short DTMF type acoustic identification signals 20, 120, at least partly encrypted, when the emission means 13, 113 are activated by the sender 11 or the receiver 111, by means of an element 14, 114 accessible from the outside of the card (not visible in FIG. 2 since it is located on the other side of the card).

The acoustic signals 20, 120 are received by microphones 17, 117 on telephone equipment, and the sender and the receiver put their card 10, 110 into contact with the microphones. The system also comprises means 19, 119 of transmitting acoustic signals 20, 120, located in the telephone equipment 16, 116. These transmission means transmit electronic signals to a remote location after methoding through the communications network 15. The system also comprises computer means 21 dependent on computer services 18 in the fax management center 30. These computer means are connected to the communications network 15 and are not on the same site as the telephone equipment 16, 116, and the fax machines 161, 261.

These computer means 21 comprise:
- a database 23 containing the references of each card and each receiver or sender and their identification data,
- methoding means 24 and means 25 of comparing electronic signals and identification data contained in the database,
- storage means 21a, storing the fax sent by the first fax machine 161, if the identifiers of the card belonging to the sender 11 are validated,
- means 21b of delivering a fax waiting report 190 to the receiver 11,
- means 28 of sending a fax which, if the identifiers on the card belonging to the receiver 111 are validated, will be used to send the fax 262 for which the fax management center issued the fax waiting report 190, to the fax machine 261 belonging to the receiver 111.

Preferably, the card encryption and decryption means in the computing services are designed such that the acoustic signal is different for each operation, as described above, particularly with reference to FIGS. 3 and 4.

Therefore, the usage sequence is as follows:

On transmission:
- The sender 11 uses the keypad 164 on his fax machine or the keypad 27 on his telephone equipment 16, to dial the telephone number of the fax management center 30. When the line is taken, a voice prompts him to identify himself with his card 10.
- The sender 11 uses his card 10 with the microphone 17 on the telephone equipment 16 associated with fax machine 161. He is then immediately identified and his card 10 is authenticated.
- He is then prompted to input the number of the receiver's fax machine. If this number appears in the list of authorized correspondents, he will then hear his fax machine 161 get into contact with the fax management center 30. He can then hang up, since his fax machine 161 has taken the communications line 15.

The fax 162 reaches the fax management center 30 where it is stored. The fax management center then sends a fax waiting report 190 to the named receiver 111.

On reception:

The receiver 111, thus informed, goes to his fax machine 261. He uses the keypad 127 on the telephone equipment 116 associated with his fax machine 261 to dial the number of the fax management center. As soon as the line is taken, a voice prompts him to identify himself with his card.

The receiver 111 uses his card 110 with the microphone 117 on the telephone equipment 116. The fax management center 30 sends the fax which is addressed to the receiver 111 thus identified, after prompting the receiver 111 to stay by the fax machine 261.

In one variant embodiment shown in FIG. 2 designed to increase the security of the system, the computer means 21 also comprise second comparison means 26. These comparison means 26 are used to compare a pin code of the receiver and/or the sender contained in the database 23 with the pin code sent by the receiver and/or the sender. These codes are input using keypads 27, 127 associated with the telephone equipment 16, 116 and/or cards 10, 110 and/or using keypads 164, 264 on fax machines 161, 261. These codes are sent to computer means 21 at the fax management center 30 through the communications network 15.

Thus, the fax management center 30 and the sender and receiver are assured that the fax has actually been properly exchanged between authorized persons. A thief cannot use a stolen card because he does not know the pin code.

In the variant embodiment shown in FIG. 2, the fax management center 30 also comprises emission means 29 for sending a fax collected report 191 to the sender 11.

What is claimed is:

1. Method for reliably sending a fax between a sender sending the fax and at least one receiver (11 FIG. 1) receiving the fax (162 FIG. 1) by means of a fax machine (161 FIG. 1) associated with telephone equipment (16 FIG. 1), and particularly a terminal emulating this function, the faxes being routed between the sender and the receiver through a communications network (15) via a fax management center (30), the said method being such that:

the fax management center (30) provides the receiver (11 FIG. 1) with a card (10 FIG. 1), the same size as a credit card, personalized by specific identifiers for each card and each receiver, the said card (10 FIG. 1) emits short DTMF type acoustic identification signals (20 FIG. 1), at least partly encrypted and different in each operation, when it is activated through an element (14 FIG. 1) by the receiver (11 FIG. 1), said card (10):

also counts (105) the number of times C(p,n) (242) that it has been used and activated by the element (14), wherein C(p,n) takes account of all activations, including activations at a wrong time, emits acoustic identification signals (20) representing the number of tines C(p,n) (242) that it has been used and activated by the element (14), encrypts (103) acoustic identification signals (20) into a function S(p,n) as a function of the number of times (p,n) (242) it has been used and activated by the element (14), the said method comprises the following steps:

the receiver (11 FIG. 1) activates (14 FIG. 1) kin the card (10 FIG. 1) such that it sends acoustic identification signals (20 FIG. 1), signals received by a microphone (17 FIG. 1) in the said telephone equipment (16 FIG. 1) are transmitted in the form of electronic signals through the communications network (15 FIG. 1) and received by the computer service (18 FIG. 1) in the fax management center (30), the transmitted electronic signals and the specific identifiers held by the computer service (18 FIG. 1) are processed (24) and electronically compared (25) by the computer service (18 FIG. 1 ) in the fax management center (30), by computer means (21) which store (230) the number of times C(p,m) (246) that the card has been used at the time of the last validated operation, compare (245) the number of times C(p,n) (242) that the card has been used at the time of the current operation, with the memorized number of times C(p,m) (246), refuse the current operation if C(p,n) (242) is less than or equal to C(p,m) (246) and continue verifying the current operation if C(p,n) (242) is greater than C(p,m) (246), recalculate (239) the acoustic identification signals (20) into a function S'(p,n) (248) as a function of the number of times C(p,n) (242) said card has been used and activated by the element (14) at the time of the current operation and as a function of said specific identifiers, then compare (249) S'(p,n) with the transmitted electronic signals S(p,n) (241), if they are conform, the fax management center (30) forwards the fax (162 FIG. 1) addressed by the sender to the fax machine (161 FIG. 1) belonging to the receiver (11 FIG. 1).

2. Method according to claim 1, also comprising the following step:

the sender and/or the receiver use a keypad (27, 127) associated with the first and/or second telephone, equipment (16, 116) to send a pin code, after being sent to the computer service (18) in the fax management center (30) via the communications network (15), this pin code is processed and compared with the pin code of the sender and/or the receiver held by the computer service (18) in the fax management center (30).

3. Method according to claim 1, also comprising the following step:

the fax management center (30) sends a confidential fax waiting report (190 FIG. 2) to the receiver (111 FIG. 2).

4. Method according to claim 1, also comprising the following step:

a fax collected report (191) is addressed to the sender (11) by the fax management center (30).

5. Method used to transmit a fax in a reliable manner between at least two persons, one (the sender) (11 FIG. 2) sending the fax (162 FIG. 2) by means of a first fax machine (161 FIG. 2) associated with first telephone equipment (16 FIG. 2), and particularly a first terminal emulating this function, the other (the receiver) (111 FIG. 2) receiving, the fax (262 FIG. 2) by means of a second fax machine (261 FIG. 2) associated with second telephone equipment (116 FIG. 2), and particularly a second terminal emulating, this function, the faxes (162) being routed through a communications network (15) via a center (30) for management of faxes exchanged between the sender (11) and the receiver (111), the fax management center (30) provides the sender (11 FIG. 2) and the receiver (111 FIG. 2) with a card (10, 110 FIG. 2), the same size as a credit card, personalized by identifiers-specific to each sender (11 FIG. 2) and each receiver (111 FIG. 2), the said card (10, 110 FIG. 2) emits short DTMF type acoustic identification signals (20, 120 FIG. 2), at least partly encrypted and varying with each operation, when it is activated (14) by the sender (11 FIG. 2) or the receiver (111 FIG. 2) through an element (14 FIG. 1), the said card (10, 110 FIG. 2):

also counts (105) the number of times C(p,n) (242) that it has been used and activated by the element (14), wherein C(p,n) takes account of all activations, including activations at a wrong time, p2 emits acoustic signals (20, 120) representing the number of times C(p,n) (242) that it has been used and activated by the element (14), encrypts (103) acoustic identification signals (20, 120) into a function S(p,n) as a function of the number of times C(p,n) (242) that it has been used and activated by the element (14), the said acoustic identification signals (20, 120) are received by a microphone (17, 117 FIG. 2) of the telephone equipment, and particularly a terminal emulating this function, and are converted into electronic signals before being transmitted through the communications network (15) to the computer service (18) in the fax management center (30), the said method comprises the following steps:

the sender (11 FIG. 2) activates (14 FIG. 2) the sender card such that it sends acoustic identification signals (20 FIG. 2), the acoustic identification signals (20 FIG. 2) received by the microphone (17 FIG. 2) on the first telephone equipment (16 FIG. 2) and transmitted in the form of said electronic signals through the communications network (15 FIG. 2) and the specific identifiers held by the computer service (18 FIG. 2) are processed (24 FIG. 2) and electronically compared (25 FIG. 2) by the computer service (18 FIG. 2) in the fax management center (30 FIG. 2), by computer means (21) which:

store (230) the number of times C(p,n) (246) that the sender card (10) has been used at the time of the last validated operation, compare (245) the number of times C(p,n) (242) that the sender card (10) has been used at the time of the current operation, with the memorized number of times C(p,m) (246), refuse the current operation if C(p,n) (242) is less than or equal to C(p,m) (246) and continue verifying the current operation if C(p,n) (242) is greater than C(p,m) (246), recalculate (239) the acoustic identification signals (20) into a function S'(p,n) as a function the number of tines C(p,n) (242) that the sender card (10) has been used and activated by the element (14) at the time of the current operation and as a function of said specific identifiers, then compare (249) S'(p,n) with the transmitted electronic signals S(p,n) (241), such that if the results conform the fax (162 FIG. 2) sent by the sender (11 FIG. 2) by means of the said first fax machine (161 FIG. 2) is stored by the fax management center (30), the receiver (111 FIG. 2) activates the receiver card (110 FIG. 2) so that it emits acoustic identification signals (120 FIG. 2), the acoustic identification signals (120 FIG. 2) received by the microphone (117 FIG. 2) on the said second telephone equipment (16 FIG. 2) and transmitted in the form of electronic signals through the communications network (15 FIG. 2) and the specific identifiers held by the computer service (18 FIG. 2) are processed (24 FIG. 2) and electronically compared (25 FIG. 2) by the computer service (18 FIG. 2) in the fax management center (30 FIG. 2), by computer means which:

store (230) the number of times C(p,m) (246) that the receiver card has been used at the time of the last validated operation, compare (245) the number of times C(p,n) (242) that the receiver card has been used at the time of the current operation, with the memorized number of times C(p,m) (246), refuse the current operation if C(p,n) (242) is less than or equal to C(p,m) (246) and continue verifying the current operation if C(p,n) (242) is greater than C(p,m) (246), recalculate (239) the acoustic identification signals (120) into a function S'(p,n) as a function the number of times C(p,n) (242) that the receiver card has been used and activated by the element (14) at the time of the current operation and as a function of said specific identifiers, then compare (249) S'(p,n) with the transmitted electronic signals S(p,n) (241), such that if the results are conform, the fax management center (30) sends the fax (262 FIG. 2) stored by the fax management center to the second fax machine (261 FIG. 2) and the receiver (111 FIG. 2).

6. System used to transmit a fax (162 FIG. 1) in a reliable manner between a sender sending the fax and at least one receiver (11 FIG. 1) receiving, the fax using a fax-machine (161 FIG. 1) associated with telephone equipment (16 FIG. 1) (or a terminal emulating this function), the faxes being routed between the sender and receiver through a communications network (15) via a fax management center (30), the said system being such that it comprises:

at least one card (10 FIG. 1) for use by the receiver (11 FIG. 1), the same size as a credit card, personalized by identifiers specific to each card and to each receiver, the said card (10 FIG. 1) comprising:

emission means (13 FIG. 1) of emitting, short DTMF type acoustic identification signals (20 FIG. 1), activated (14 FIG. 1) by the receiver (11 FIG. 1) using an element (14 FIG. 1) accessible from the outside of the card (10 FIG. 1), an incremental counter (105), interconnected to the emission means (13) and an encryption means (103), which are incremented by at least one unit each time that the card (10) is activated by element (14) and said card (10 FIG. 1) has emitted said acoustic identification signals (20 FIG. 1), an encryption means (103) interconnected with the incremental counter (105) and the emission means (13) for encrypting at least partially and varying the acoustic identification signals (20 FIG. 1) into a function S(p,n) as a function of said number of times C(p,n) (242) the card (10 FIG. 1) has been used and activated by element (14), wherein C(p,n) takes account of all activations, including activations at a wrong time, telephone equipment (16 FIG. 1) (or any terminal emulating this function) comprising a microphone (17 FIG. 1) designed to receive and transform received acoustic identification signals into electronic signals transmitted through the communications network (15) to the computer services (18) in the fax management center (30), computer means (21) associated with the computer services (18) in the fax management center (30) connected to the communications network (15), the said computer means (21), comprising:

a database (23) containing the references of each receiver card and each receiver and said specific identifiers, a means of memorizing (23, 230) the number of times C(p,n) (246) that the receiver card has been used at the time of the last validated operation, a means of comparing (245) the number of times C(p,n) (242) that the receiver card has been used at the time of the current operation, with the memorized number of times C(p,m) (246), such that the check on the current operation is refused if C(p,n) (242) is less than or equal to C(p,m) (246) and is continued if C(p,n) (242) is greater than C(p,m) (246), a means for recalculating (239) said acoustic identification signals (20 FIG. 1) into a function S'(p,n) (248) as a function of the number of times C(p,n) (242) said card has been used and activated by the element (14) at the time of the current operation and as a function of said specific identifiers, a means for comparing S'(p,n) to S(p,n)

means (28) of sending a fax, which, if the results conform, send the fax (162 FIG. 1) addressed to the receiver (11 FIG. 1) by the sender to the fax machine (161 FIG. 1) belonging to the receiver (11 FIG. 1).

7. System according to claim 6 such that the fax management center also comprises means of delivering (21b FIG. 2) a fax waiting report (190 FIG. 2) to the receiver (111 FIG. 2).

8. System used to transmit a fax in a reliable manner between at least two persons, one (the sender) (11 FIG. 2) sending the fax (162 FIG. 2) by means of a first fax machine (161 FIG. 2) associated with first telephone equipment (16 FIG. 2), and particularly a first terminal emulating this function, the other (the receiver) (111 FIG. 2) receiving the fax on a second fax machine (261 FIG. 2) associated with second telephone equipment (116 FIG. 2), and particularly a second terminal emulating this fiction, the faxes being routed through a communications network (15) via a fax management center (30) managing faxes exchanged between sender and receiver, the said system being such that it comprises:

at least two cards (10, 110 FIG. 2), one for use by the receiver (111 FIG. 2) (the receiver card), the other for use by the sender (11 FIG. 2) (the sender card) the same size as a credit card, personalized by identifiers specific to each card and to each sender or receiver; the said receiver card or sender card comprising:

an emission means (13, 113 FIG. 2) of emitting short DTMF type acoustic signals (20, 120 FIG. 2), activated by the sender or the receiver, by means of an element (14, 114 FIG. 2) accessible from the outside of the receiver card or sender card, an incremental counter (105), interconnected to the emission means (13) and an encryption means (103), which are incremented by at least one unit each time that the card (10) is activated by element (14) and said card (10 FIG. 1) has emitted said acoustic identification signals (20 FIG. 1), an encrypting means (103) interconnected with the incremental counter (105) and the emission means (13) for encrypting at least partially and varying the acoustic identification signals (20 FIG. 1) into a function S(p,n) as a function of said number of times C(p,n) (242) the card (10 FIG. 1) has been used and activated by element (14), wherein C(p,n) takes account of all activations, including activations at a wrong time, the said system being such that:

the first and second telephone equipment (16, 116 FIG. 2), particularly a first or second terminal emulating this function, comprise a microphone (17, 117 FIG. 2) designed to receive and transform the received acoustic identification signals into electronic signals transmitted through the communications network (15) to computer services (18) in the fax management center (30), computer means (21) associated with the computer services (18) in the fax management center (30), connected to the communications network (15), the said computer means (21) comprising:

a database (23) containing the references of each receiver card or sender card and each receiver or sender and said specific identifiers, a means of memorizing (23, 230) respectively the number of times C(p,n) (246) that the receiver card or the sender card has been used at the time of the last validated operation, a means of comparing (245) respectively the number of times C(p,n,) (242) that the receiver card or the sender card has been used at the time of the current operation, with respectively the memorized number of times C(p,m) (246), such that the check on the current operation of the receiver card or the sender card is refused if respectively C(p,n) (242) is less than or equal to C(p,m) (246) and is continued if respectively C(p,n) (242) is greater than C(p,n) (246), a means for recalculating (239) respectively said acoustic identification signals (20, 120 FIG. 2) emitted respectively by the receiver card and the sender card into a function S'(p,n) (248) as a function of the number of times C(p,n) (242) said receiver card and said sender card has been respectively used and activated by the element (14) at the time of the current operation and as a function of said specific identifiers, a means for comparing respectively S'(p,n) to S(p,n) and for validating respectively the sender's card identifiers and the receiver's card identifiers storage means (21a FIG. 2) storing the fax sent by the first fax machine, if the sender's card identifiers are validated, fax sending means (28 FIG. 2) sending the fax to the fax machine (261 FIG. 2) belonging to receiver (111 FIG. 2), if the receiver's card identifiers are validated.

9. System according to claim 8, the said computer means (21) also comprising:

second means (26) of comparing a pin code belonging to the sender or receiver contained in the database, with a pin code,
sent by the sender or receiver using, a keypad (27, 127) associated with the first and/or second telephone equipment (16, 116) or the sender's and/or the receiver's card,
and sent to the computer means (21) of the fax management center through the communications network.

10. System according to claim 8, such that the fax management center also comprises means of sending (29 FIG. 2) a fax collected report (191 FIG. 2) to the sender.

* * * * *